(12) United States Patent
Ooitsu

(10) Patent No.: US 6,513,981 B2
(45) Date of Patent: Feb. 4, 2003

(54) RETAINER FOR ROLLING BEARING AND MANUFACTURING METHOD THEREFOR

(75) Inventor: Junya Ooitsu, Kashiwara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/897,969

(22) Filed: Jul. 5, 2001

(65) Prior Publication Data
US 2002/0003912 A1 Jan. 10, 2002

(30) Foreign Application Priority Data
Jul. 6, 2000 (JP) .................................. 2000-205186

(51) Int. Cl.[7] .............................. F16C 33/56; B21K 1/05
(52) U.S. Cl. ................... 384/470; 29/898.067; 384/527
(58) Field of Search ................... 384/523, 527, 384/528, 470; 29/898.067

(56) References Cited

U.S. PATENT DOCUMENTS

| | | | | |
|---|---|---|---|---|
| 3,027,626 A | * | 4/1962 | Murphy | 384/527 |
| 3,212,832 A | * | 10/1965 | Mayer et al. | 29/898.067 |
| 3,550,248 A | * | 12/1970 | Fretz | 29/898.067 |
| 3,744,862 A | * | 7/1973 | Schwartz | 384/527 |
| 4,541,739 A | * | 9/1985 | Allen et al. | 384/470 |
| 4,781,877 A | * | 11/1988 | Rabe | 29/898.067 |
| 5,223,203 A | | 6/1993 | Seifert et al. | |
| 5,900,197 A | | 5/1999 | Matsui et al. | |

FOREIGN PATENT DOCUMENTS

| | | |
|---|---|---|
| EP | 0 992 696 | 4/2000 |
| GB | 826091 | 12/1959 |
| JP | 09-317774 | 9/1997 |

OTHER PUBLICATIONS

Patent Abstracts of Japan vol. 016, No. 057 (M–1210), 03–255223, "Roller Bearing" K. Makoto.

* cited by examiner

*Primary Examiner*—Thomas R. Hannon
(74) *Attorney, Agent, or Firm*—Nixon & Vanderhye P.C.

(57) ABSTRACT

A retainer for rolling bearings is made from a phenol resin in which graphite and cotton fabric chips are mixed, and an inner circumferential surface and side surfaces other than inner circumferential surfaces of the pockets of the retainer are made of a skin layer. Therefore, the strength can be ensured with this skin layer, while the skin layer is absent in the inner circumferential surfaces of the pockets serving as sliding surfaces, allowing the graphite and the cotton fabric chips to be exposed, so that the lubricating performance can be ensured. Thus, a retainer for rolling bearings, as well as a manufacturing method therefor, which allows lubricating performance and strength to be ensured at the same time can be provided.

3 Claims, 1 Drawing Sheet

RETAINER FOR ROLLING BEARING AND MANUFACTURING METHOD THEREFOR

BACKGROUND OF THE INVENTION

The present invention relates to a retainer for rolling bearings made from synthetic resin, and to a manufacturing method therefor.

For conventional synthetic-resin Trade retainers for use as retainers for rolling bearings, their raw materials have been given by those in which various synthetic resins are combined with various reinforcing materials and filler materials according to their required characteristics. Meanwhile, synthetic-resin made retainers in common use are those which are formed by fabrication with molding machines or those which are fabricated into a retainer configuration by machining work.

For example, retainers of angular contact ball bearings to be used for spindles of machine tools or the like include outer-ring guided ones. This type of retainers are required to have seizure resistance performance. To meet this characteristic requirement, we have made performance evaluations with retainers made from resin materials to which various types of filler materials (graphite, molybdenum disulfide, PTFE (polytetrafluoroethylene)) were added. As a result of this, the following problems (1) and (2) were found out:

(1) In injection molded articles, it was found that their surface was covered with a skin layer, material and resulting in earlier seizures. The terms skin layer, represent an outermost surface layer of a model article, and a surface layer made of only resin material having no filler material is herein referred to as a skin layer.

(2) In retainers whose outer configuration was made by machining work, it was found that since no skin layer was formed on the surface, allowing the filler material to be exposed at the surface and so allowing specified lubricating performance to be fulfilled, whereas cracks would be more likely to occur from the filler material as a starting point (lack of strength).

SUMMARY OF THE INVENTION

Therefore, an object of the present invention is to provides a retainer for rolling bearing, as well as a manufacturing method therefor, which allows both lubricating performance and strength to be ensure at the same time.

In order to achieve the above object, there is provided a retainer for rolling bearings, which is made from a synthetic resin base material in which a lubricant and a reinforcing material are mixed, wherein a skin layer is provided at least part of the retainer other than inner circumferential surfaces of pockets.

In this rolling-bearing retainer, the strength is ensured by the skin layer formed over a region other than the inner circumferential surfaces of the pockets. The skin layer is not provided at the inner circumferential surfaces of the pockets serving as sliding surfaces. Therefore, the lubricant for lubricity improvement can be exposed, so that lubricating performance can be ensured. Therefore, both lubricity and strength can be satisfied at the same time.

In one embodiment of the present invention, the skin layer is absent on a guide surface.

According to the above embodiment, since no skin layer is provided at the guide surface serving as a sliding surface, the lubricant can be exposed at this guide surface, allowing the lubricity to be ensured and so making it possible to prevent seizures. Also, since the guide surface, of which strict dimensional precision is demanded, is formed by machining after injection molding, the injection molding can be performed in simple structure, which allows a cost reduction of the metal mold.

Also, there is provided a method for manufacturing a retainer for rolling bearings, comprising the steps of:

forming a ring by injection molding from a synthetic resin material in which a lubricant and a material are mixed; and boring in the ring, circumferentialy, a plurality of holes serving as pockets for accommodating rolling elements therein by machining work.

According to the above manufacturing method of a retainer for rolling bearings, the ring is formed by injection molding, and subsequently holes serving as pockets are formed in the ring by machining work. Therefore, the skin layer is absent at the inner circumferential surfaces of the pockets, and remains over the region other than the inner circumferential surfaces of the pockets. As a result of this, the lubricity of the inner circumferential surfaces of the pockets can be ensured, while the mechanical strength as a whole can be ensured with the skin layer formed over the region other than the inner circumferential surfaces of the pockets.

Also, since the inner circumferential surfaces of the pockets, of which strict dimensional precision is demanded, is formed by machining after injection molding, the metal mold used in an injection molding can be simplified in structure, which allows a cost reduction of the metal mold.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinbelow, the present invention is described in detail by way of embodiments thereof illustrated in the accompanying drawings.

Figure 1:
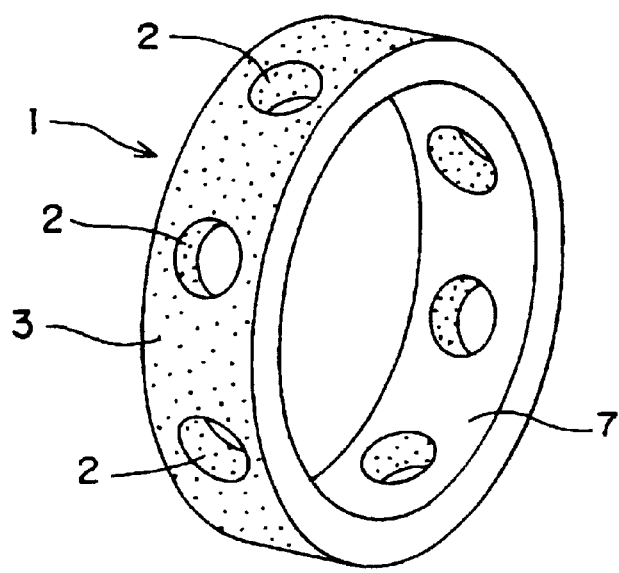
FIG. 1 is a perspective view of an embodiment of the retainer for rolling bearings according to the present invention.

FIG. 1 shows an embodiment of the retainer for rolling bearings according to the invention. In this retainer 1, which is ring-shaped as a whole, a plurality of pockets 2 for accommodating rolling elements therein are formed so as to be circumferentially spaced from one another at specified intervals. This retainer 1 is made from a phenol resin in which graphite as a lubricant and cotton fabric chips as a reinforcing material are mixed. The mixing ratios for this may appropriately be 30 to 50 wt % of phenol resin, 20 to 30 wt % of cotton fabric chips and 30 to 40 wt % of graphite.

Figure 2:
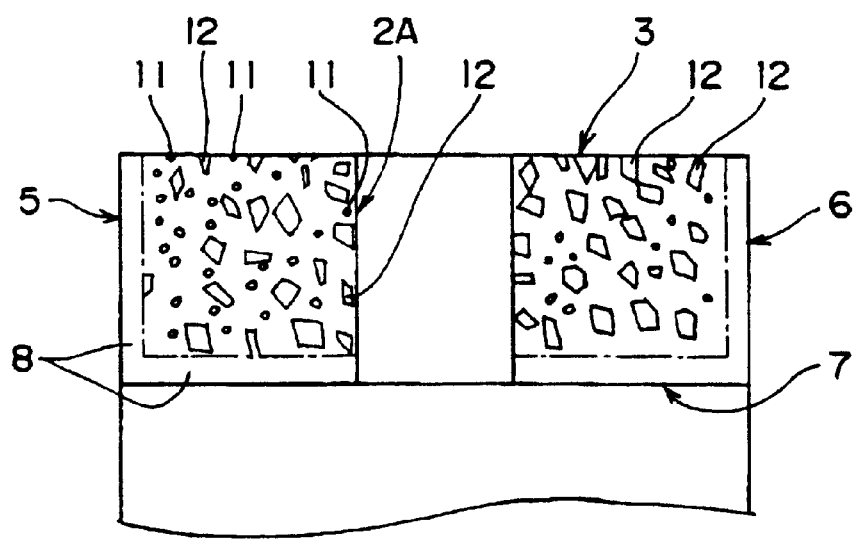
FIG. 2 is a cross-sectional schematic view of the embodiment.

As shown in FIG. 2, the skin layer is provided neither at an inner circumferential surface 2A of the pocket nor at an outer circumferential surface 3 thereof. Meanwhile, a skin layer 8 is provided at both side surfaces 5, 6 and an inner circumferential surface 7. This skin layer 8 is made from phenol resin, containing substantially no graphite or cotton fabric chips.

Accordingly, cotton fabric chips 12 impregnated with graphite 11 and lubricating oil and mixed ii the phenol resin are exposed at the outer circumferential surface 3 of this retainer 1 and at the inner circumferential surface 2A of the pocket, by which specified lubricating performance is ensured. It is noted that in this FIG. 2, the cotton fabric chips 12 and the graphite 11 are depicted as larger than actual.

Meanwhile, the strength as a whole is ensured by the side surfaces 5, 6 and the inner circumferential surface 7 both covered with the skin layer 8. The cotton fabric chips 12 as a reinforcing material also plays the role of enhancing the strength as a whole.

Next, the method of manufacturing the retainer of this embodiment is described.

First, such a ring as shown in FIG. 1 is formed by injection molding from a raw material of phenol resin in which the cotton fabric chips 12 and the graphite 11 are mixed at specified amounts, respectively. Then, holes forming such pockets 2 as shown in FIG. 1 are bored in this ring by machining work. As a result of this, as shown in FIG. 2, the cotton fabric chips 12 and the graphite 11 are exposed at the inner circumferential surfaces 2A of the pockets. Further, the skin layer remaining at the outer circumferential surface of this ring is scraped off, so that the cotton fabric chips 12 and the graphite 11 are exposed at the offer circumferential surface 3 as shown in FIG. 2.

With this manufacturing method, since the inner circumferential surfaces 2A of the pockets as well as the outer circumferential surface 3 serving as a guide surface, of which strict dimensional precision is demanded, are formed by machining work after injection molding, the metal mold used in the injection molding can be simplified in structure, so that a cost reduction of the metal mold can be achieved.

Although phenol resin has been used as the resin serving as a main raw material in this embodiment, PI (polyimide) or PEEK (polyether ether ketone) are also usable. Also, PTFE or molybdenum disulfide may be used as the lubricant, besides the graphite 11. Further, glass fiber may be used as the reinforcing material, besides the cotton fabric chips.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A retainer for rolling bearings, which is made from a synthetic resin base material in which a lubricant and a reinforcing material are mixed, wherein a skin layer is provided at least part of the retainer other than inner circumferential surfaces of pockets.

2. The retainer for rolling bearings according to claim 1, wherein the skin layer is absent on a guide surface.

3. A method for manufacturing a retainer for rolling bearings, comprising the steps of:

forming a ring by injection molding from a synthetic resin material in which a lubricant and a reinforcing material are mixed; and boring in the ring, circumferentially, a plurality of holes serving as pockets for accommodating rolling elements therein by machining work.

* * * * *